United States Patent
Watfa et al.

(10) Patent No.: US 12,231,956 B2
(45) Date of Patent: Feb. 18, 2025

(54) BACK-OFF MECHANISMS FOR TRANSMISSION OF DATA OVER CONTROL PLANE

(71) Applicant: QUALCOMM Incorporated, San Diego, CA (US)

(72) Inventors: Mahmoud Watfa, St-Leonard (CA); Miguel Griot, La Jolla, CA (US); Sebastian Speicher, Wallisellen (CH); Juan Zhang, Beijing (CN); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/753,724

(22) PCT Filed: Sep. 27, 2019

(86) PCT No.: PCT/CN2019/108406
§ 371 (c)(1),
(2) Date: Mar. 11, 2022

(87) PCT Pub. No.: WO2021/056384
PCT Pub. Date: Apr. 1, 2021

(65) Prior Publication Data
US 2022/0377613 A1    Nov. 24, 2022

(51) Int. Cl.
*H04W 28/08*     (2023.01)
*H04W 28/02*     (2009.01)
*H04W 48/06*     (2009.01)

(52) U.S. Cl.
CPC ... *H04W 28/0908* (2020.05); *H04W 28/0289* (2013.01); *H04W 48/06* (2013.01)

(58) Field of Classification Search
CPC ............. H04W 28/0908; H04W 48/06; H04W 28/0289; H04W 74/085
See application file for complete search history.

(56) References Cited

U.S. PATENT DOCUMENTS

| | | |
|---|---|---|
| 2018/0270778 A1 | 9/2018 | Bharatia |
| 2019/0223093 A1 | 7/2019 | Watfa et al. |

(Continued)

FOREIGN PATENT DOCUMENTS

| | | |
|---|---|---|
| CL | 2019000076 A1 | 4/2019 |
| CN | 108574964 A | 9/2018 |

(Continued)

OTHER PUBLICATIONS

Clarivate Analytics, English Translation of WO 20200001102, 2024 (Year: 2024).*

(Continued)

*Primary Examiner* — Mohammad S Anwar
(74) *Attorney, Agent, or Firm* — Arent Fox Schiff LLP

(57) ABSTRACT

Various techniques and approaches described herein may be applied to control congestion at a session management (SM) function (SMF) based on at least one back-off timer maintained at a user equipment (UE). In an aspect of the disclosure, a method, a computer-readable medium, and an apparatus are provided. The apparatus may be a UE. The UE may be configured to establish a protocol data unit (PDU) session with a SMF. The UE may be configured to determine whether a back-off timer associated with the PDU session is terminated. The UE may refrain from sending, to the SMF, data over a control plane associated with the PDU session when the back-off timer is unterminated. The UE may send, to the SMF, the data over the control plane associated with the PDU session when the back-off timer is terminated.

28 Claims, 6 Drawing Sheets

(56) References Cited

U.S. PATENT DOCUMENTS

| | | | | |
|---|---|---|---|---|
| 2019/0357118 A1* | 11/2019 | Kim | .................... | H04W 76/18 |
| 2020/0037203 A1* | 1/2020 | Ianev | ................ | H04W 28/0289 |
| 2021/0037415 A1* | 2/2021 | Liu | ....................... | H04W 4/70 |
| 2021/0092634 A1 | 3/2021 | Kang | | |

FOREIGN PATENT DOCUMENTS

| | | | | |
|---|---|---|---|---|
| WO | 2018063800 A1 | 4/2018 | | |
| WO | 2018131970 A1 | 7/2018 | | |
| WO | 2019011190 A1 | 1/2019 | | |
| WO | 2019072681 A1 | 4/2019 | | |
| WO | 2019135581 A1 | 7/2019 | | |
| WO | WO-2020001102 A1 * | 1/2020 | ........ | H04W 28/0289 |

OTHER PUBLICATIONS

Supplementary European Search Report—EP19947093—Search Authority—The Hague—May 11, 2023.

"3rd Generation Partnership Project; Technical Specification Group Services and System Aspects; System Architecture for the 5G System (5GS); Stage 2 (Release 16)", 3GPP Standard; Technical Specification; 3GPP TS 23.501, 3rd Generation Partnership Project (3GPP), Mobile Competence Centre, 650, Route Des Lucioles, F-06921, Sophia-Antipolis Cedex, France, vol. SA WG2, No. V16.2.0, Sep. 24, 2019 (Sep. 24, 2019), pp. 1-389, XP051784669, Retrieved from the Internet: URL: ftp://ftp.3gpp.org/Specs/archive/23_series/23.501/23501-g20.zip 23501-g20.doc, [retrieved on Sep. 24, 2019], Sections 5.9.2, 5.9.2a, 5.30.2, 5.9.4.5, p. 174-p. 191.

International Search Report and Written Opinion—PCT/CN2019/108406—ISA/EPO—Jun. 29, 2020.

* cited by examiner

BACK-OFF MECHANISMS FOR TRANSMISSION OF DATA OVER CONTROL PLANE

CROSS REFERENCE TO RELATED APPLICATION(S)

This application is a national phase entry of PCT Application No. PCT/CN2019/108406, entitled "BACK-OFF MECHANISMS FOR TRANSMISSION OF DATA OVER CONTROL PLANE" and filed on Sep. 27, 2019, which is expressly incorporated by reference herein in its entirety.

BACKGROUND

Technical Field

The present disclosure relates generally to communications systems, and more particularly, to a user equipment configured to send data over a control plane.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various techniques and approaches described herein may be applied to control congestion at a session management (SM) function (SMF) based on at least one back-off timer maintained at a user equipment (UE).

In an aspect of the disclosure, a method, a computer-readable medium, and an apparatus are provided. The apparatus may be a UE. The UE may be configured to establish a protocol data unit (PDU) session with a SMF. The UE may be configured to determine whether a back-off timer associated with the PDU session is terminated. The UE may refrain from sending, to the SMF, data over a control plane associated with the PDU session when the back-off timer is unterminated. The UE may send, to the SMF, the data over the control plane associated with the PDU session when the back-off timer is terminated.

In another aspect of the disclosure, a method, a computer-readable medium, and an apparatus are provided. The apparatus may be an Access and Mobility Management Function (AMF). The AMF may receive a mobility management (MM) message from a UE, and the MM message may include data over a control plane associated with a PDU session established between the UE and an SMF. The AMF may determine whether the UE is allowed or prohibited to send data over the control plane to the SMF for the PDU session. The AMF may send, to the UE, a message including a duration of a back-off timer when the UE is prohibited to send data to the SMF. The AMF may send, to the SMF, the data over the control plane when the UE is allowed to send the data over the control plane to the SMF.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
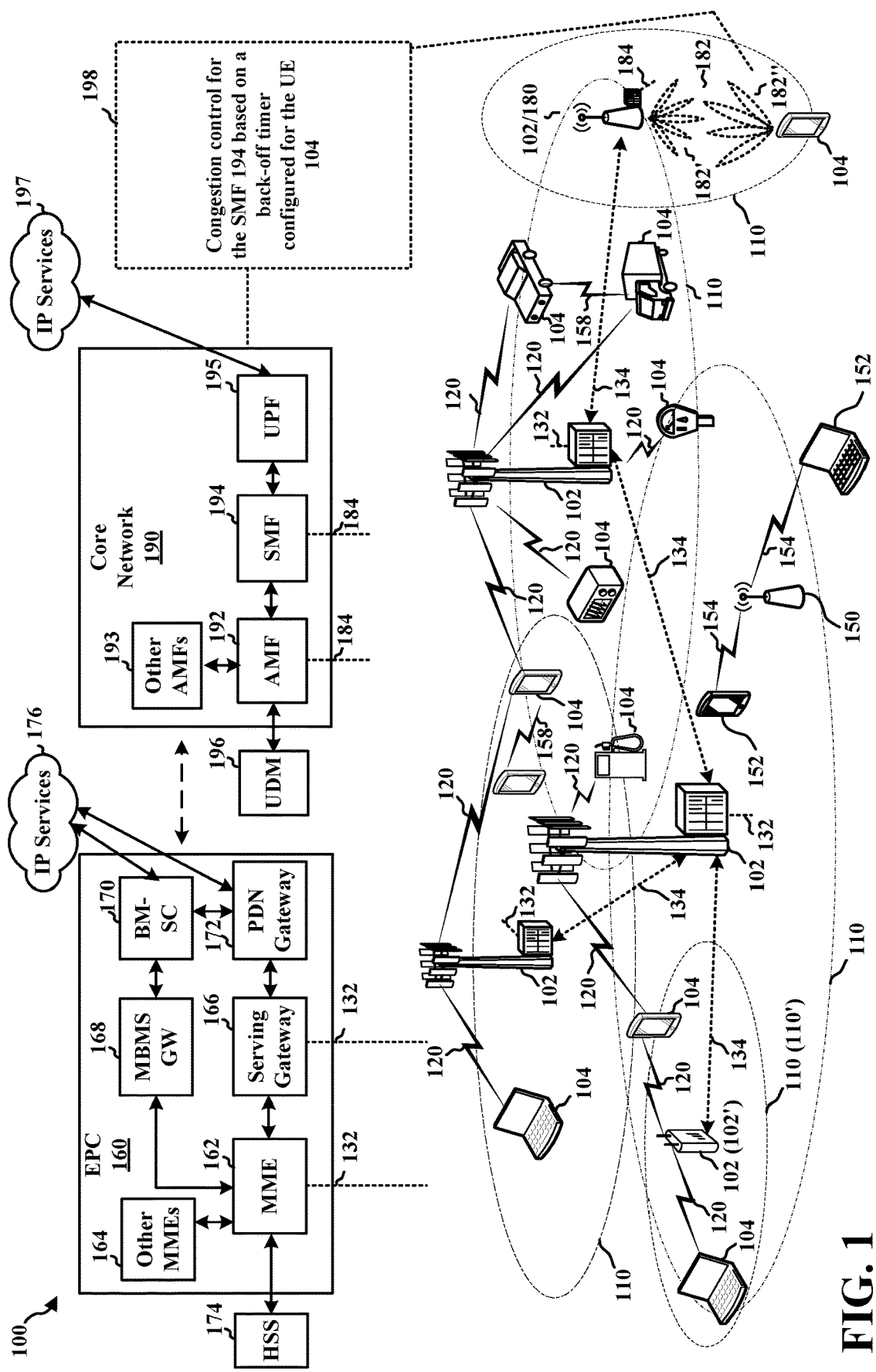
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management (MM) Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 and/or the AMF 192 may be configured to implement congestion control (198) for the SMF 194 based on one or more back-off timers maintained at the UE 104 and/or the AMF 192, as described herein.

Figure 2:
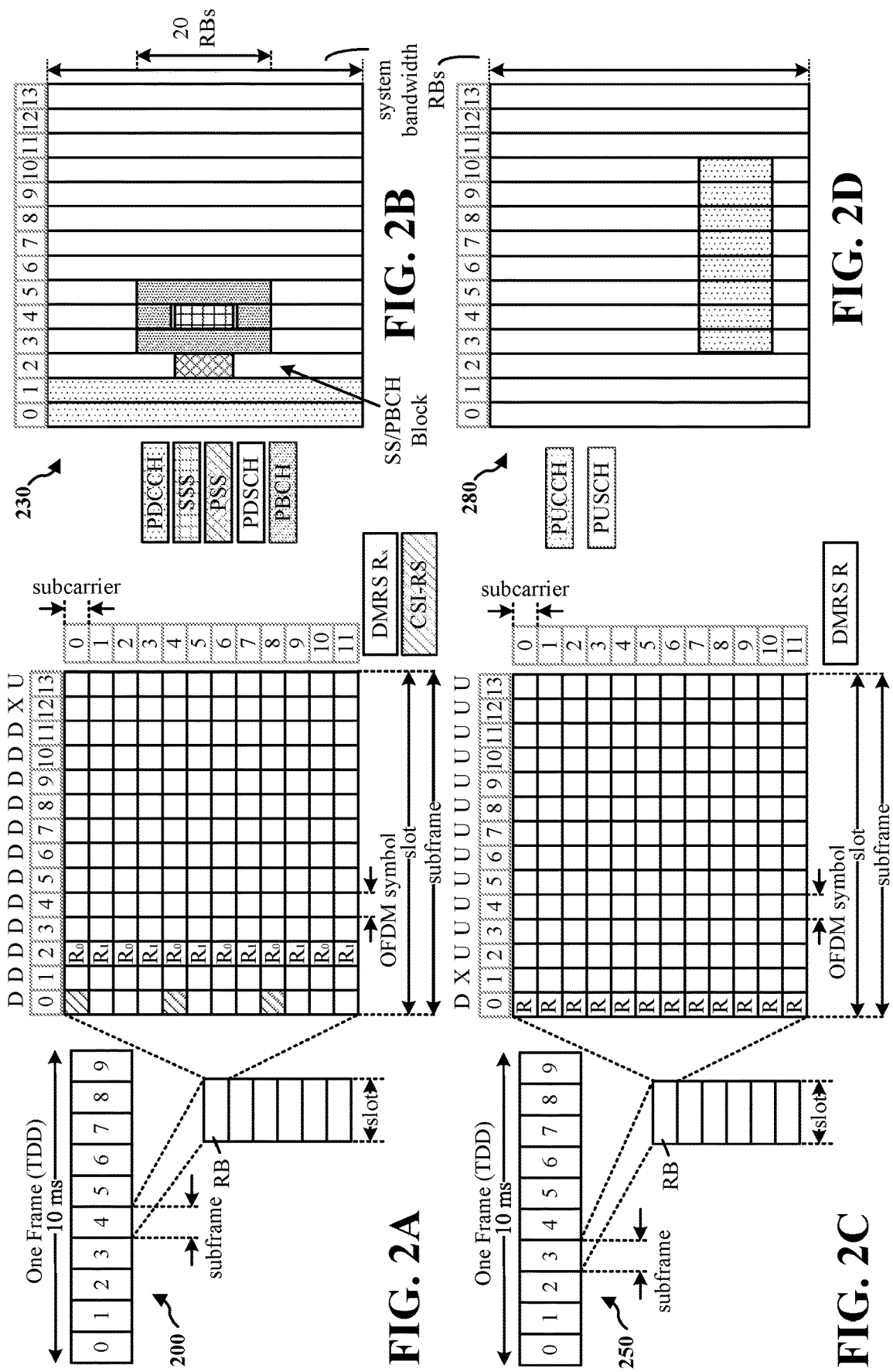
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
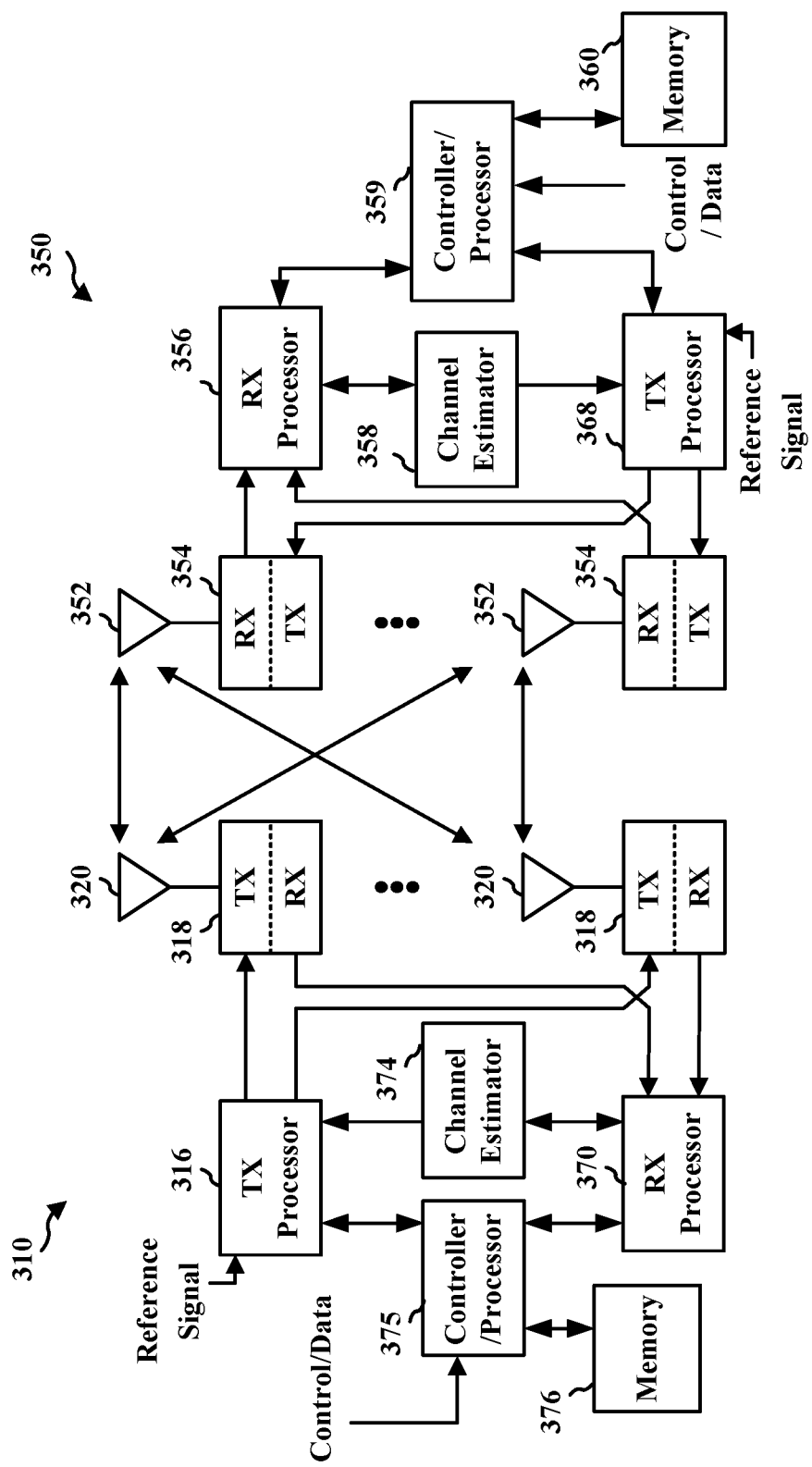
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some systems, an AMF may be configured to apply congestion control for an SMF, such as 5GSM congestion control in a 5G System (5GS). Congestion control may be applied, for example, at the slice level, data network name (DNN) level, or both the slice and DNN level. When applying congestion control for the SMF, the AMF may send, to a UE, a DL NAS Transport message containing a session management (SM) message (e.g., a 5GSM message) received from the UE and further containing a duration for a back-off timer, as described in the present disclosure.

Illustratively, upon reception of an UL NAS Transport message, if the Payload container type information element (IE) is set to "N1 SM information": the Request type IE is set to "initial request" or "existing PDU session"; or the Request type IE is set to "modification request" and the PDU session is not an emergency PDU session; the UE is not configured for high-priority access in a selected PLMN, and one of: (a) DNN-based congestion control may be activated for the DNN included in the UL NAS Transport message, or DNN-based congestion control is activated for the selected DNN in case no DNN is included in the UL NAS Transport message (e.g., configured by operation and maintenance), the AMF may be configured to send back to the UE the 5GSM message which was not forwarded, a back-off timer value, and a cause indicating "congestion" (e.g., 5GMM cause code #22); (b) single-network slice selection assistance information (S-NSSAI) and DNN-based congestion control may be activated for the S-NSSAI and DNN included in the UL NAS Transport message, or S-NSSAI and DNN-based congestion control may be activated for the S-NS SAI included in the UL NAS Transport message and the selected DNN in case no DNN is included in the UL NAS Transport message, or S-NSSAI and DNN-based congestion control is activated for the selected S-NSSAI in case no S-NSSAI is included in the UL NAS Transport message and the DNN included in the UL NAS Transport message, or S-NSSAI and DNN-based congestion control is activated for the selected S-NSSAI and the selected DNN in case no S-NSSAI and no DNN are included in the UL NAS Transport message (e.g., configured by operation and maintenance), the AMF may send back to the UE the 5GSM message which was not forwarded, a back-off timer value, and a cause indicating "insufficient resources for specific slice and DNN" (e.g., 5GMM cause code #67); or (c) S-NSSAI only based congestion control may be activated for the S-NSSAI included in the UL NAS Transport message, or S-NSSAI based congestion control is activated for the selected S-NSSAI in case no S-NSSAI is included in the UL NAS Transport message (e.g., configured by operation and maintenance), the AMF may send back to the UE the 5GSM message which was not forwarded, a back-off timer value, and a cause indicating "insufficient resources for specific slice" (e.g., 5GMM cause code #69).

When the UE receives the DL NAS Transport message including a back-off timer IE, the UE may pass information to the 5GSM layer indicating that the 5GSM message was not forwarded due to congestion control along with the 5GSM message, and the time value from the back-off timer value IE. In response, the UE may start the 5GSM back-off timer and refrain from sending mobile-originated (MO) 5GSM signaling until the back-off timer expires or until reception of a 5GSM message that terminates the back-off timer.

In some other aspects, the SMF may also apply congestion control directly to the 5GSM layer of the UE by including a back-off timer in the 5GSM messages that are sent to the UE. For example, the PDU Session Modification Reject message may include a back-off timer value IE, which may be applied by the UE at the 5GSM layer of the UE. The 5GSM layer of the UE may be configured to operate similarly to the manner described herein with respect to application of congestion control by the AMF.

Under overload conditions, the AMF may restrict requests from UEs for data transmission via control plane cellular IoT (CIoT) 5GS optimization. A control plane data back-off timer (e.g., timer T3448 in 5GS) may be returned to a UE by the AMF (e.g., in Registration Accept messages, Service Reject messages, and/or Service Accept messages). While the aforementioned control plane data back-off timer is running, the UE may refrain from initiation of any data transfer via control plane CIoT 5GS optimization (e.g., the UE may refrain from sending any initial NAS message with uplink data). The AMF may store a respective control plane data back-off timer for each UE, and the AMF may refrain from processing any further requests (e.g., other than exception reporting and paging responses) for data transport via an initial NAS message from the UE while the respective control plane data back-off timer for the UE is running.

In some further aspects, the concept of "service gap" may be defined for some systems (e.g., 5G CIoT), which may control the frequency of a transition from an Idle mode (e.g., 5GMM-Idle mode) to a Connected mode (e.g., 5GMM-Connected mode) using a service gap timer. A UE and a network in which the UE is operating (e.g., a 5G RAN) may negotiate the use of service gap control (SGC), based on which the network may provide a service gap timer (e.g., timer T3447 in 5GS) to the UE. When this service gap timer is running, the UE may be allowed by the network to: (1) request emergency service; (2) request emergency fallback; (3) request high-priority access; (4) perform a registration procedure for initial registration; (5) perform a registration procedure for mobility and periodic registration update without including an UL data status IE; and/or (6) send mobile-terminated service requests triggered by paging and subsequent MO signaling or MO data, if any, until the UE enters an Idle mode (e.g., 5GMM-Idle mode).

All UEs may not support SGC. However, the network may apply SGC for such UEs based on subscription information associated with those UEs. For example, when a UE that does not support SGC sends a 5GSM message: upon reception of an UL NAS Transport message, if the Payload container type IE is set to "N1 SM information": the Request type IE is set to "initial request" or "existing PDU session"; or the Request type IE is set to "modification request" and the PDU session is not an emergency PDU session; the UE is not configured for high-priority access in a selected PLMN, and the service gap timer (e.g., timer T3447) is running and the UE does not support SGC: (1) the current NAS signaling connection was not triggered by paging; and (2) the mobile-terminated signaling has not been sent over the current NAS signaling connection, the AMF may send back to the UE a message that was not forwarded, send information indicating the cause of "congestion" (e.g., 5GMM cause code #22), and may include a back-off timer set to the remaining time of the service gap timer maintained at the network (e.g., AMF) for the UE.

Various protocols (e.g., 5G CIoT) support the transmission of data over the control plane, which may also be known as data over NAS. When sending data over the control plane from an Idle mode (e.g., 5GMM-Idle mode), a UE may send a Control Plane Service Request (CPSR) message that includes the data and, when the data is not short-message service (SMS) data, a PDU session identifier (ID) that is associated with a PDU session for which the data is being sent. An AMF may forward the data and the PDU session ID to an SMF that is associated with the PDU session. When sending data over the control plane from a Connected mode (e.g., 5GMM-Connected mode), the UE may use a different message (e.g., a UL NAS Transport message) but each message from a UE in the Connected Mode may include the data and the PDU session ID.

The aforementioned congestion control (e.g., 5GSM congestion control) may not restrict sending data over the control plane for a PDU session at an SMF that is already congested. When congestion control is applied for 5GSM, such as at the 5GMM layer and/or 5GSM layer of a UE, the UE may be only restricted from sending 5GSM messages—that is, the UE may refrain from sending 5GSM signaling while a back-off timer is running. However, restricting only 5GSM signaling by the UE may allow the UE to continue to send data over the control plane for the same PDU session for which SMF congestion has already been indicated (therefore restricting 5GSM signaling). In sending data over the control plane to an SMF that is already congested (e.g., as indicated by the restriction to 5GSM signaling), the UE may increase the congestion experienced by an SMF. Accordingly, the present disclosure may describe various techniques and approaches to restricting data transmission over the control plane to an SMF that is congested.

Additionally, the SMF may be separated from the AMF and, therefore, congestion at one SMF does not necessarily mean that another SMF is also congested. If the aforementioned congestion control for transport of user plane is used because of congestion at one SMF, a UE with another PDU session (e.g., potentially established through a different SMF) would be restricted from sending any data for the other PDU session (e.g., to the other SMF) because the control plane data back-off timer (e.g., timer T3448 in 5GS) restricts the UE for all PDU sessions (e.g., at the 5GMM layer of the UE). Accordingly, the present disclosure may describe various techniques and approaches to restricting data transmission over a control plane to a congested SMF while allowing the UE to send data over the control plane for another PDU session that is served by another non-congested SMF.

Further, as aforementioned with respect to SGC, when an AMF receives a 5GSM message from a UE that does not support SGC but the service gap timer (e.g., timer T3447 in 5GS) for that UE is running at the AMF, the AMF may send a 5GSM message to the UE with a back-off timer in a DL NAS Transport message. However, the AMF may lack a similar mechanism for handling reception of an UL NAS Transport message for a UE that does not support SGC. Accordingly, the present disclosure may describe various techniques and approaches to handling reception by an AMF of data over the control plane from a UE that does not support SGC and the service gap timer (e.g., timer T3447 in 5GS) for that UE is running at the AMF. Similarly, the present disclosure may describe various techniques and approaches for a UE that does support SGC but still transmits an UL NAS Transport message with data, as the service gap timer for such as UE may only restrict 5GSM messages.

Figure 4:
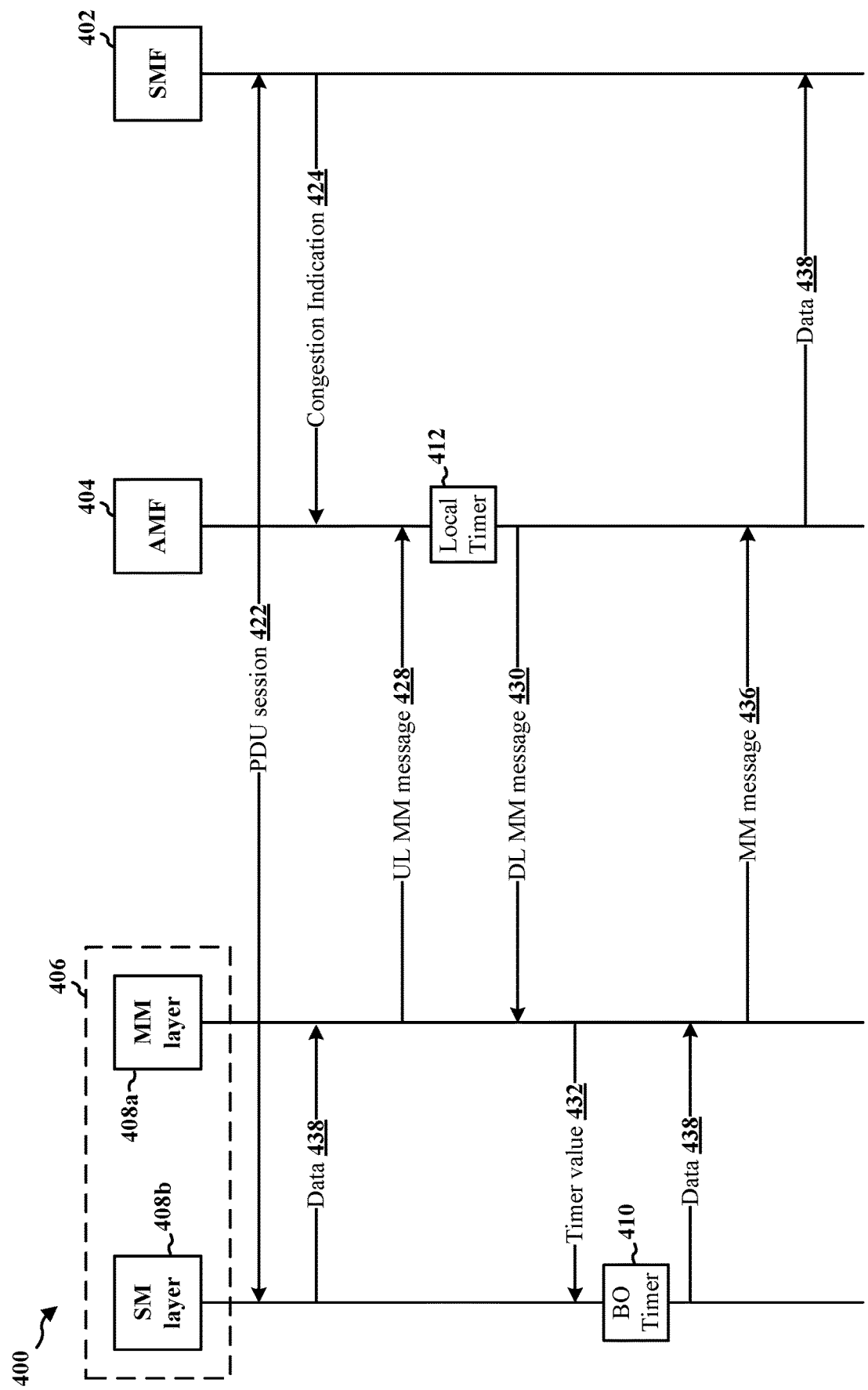
FIG. 4 is a call flow diagram illustrating a wireless communications system.

FIG. 4 is a call flow diagram of a wireless communications system 400. The wireless communications system 400 may include a UE 406 (e.g., the UE 104, the UE 350), and may further include an AMF 404 (e.g., the AMF 192, the other AMFs 193) and an SMF 402 (e.g., the SMF 194).

The UE 406 may include a plurality of layers, including at least an SM layer 408*b* (e.g., a 5GSM layer) and an MM layer 408*a* (e.g., a 5GMM layer). The MM layer 408*a* may be configured for communication with the AMF 404, whereas the SM layer 408*b* may be configured for communication with the SMF 402. In some aspects, the UE 406 may send SM messages to the SMF 402 by generating an SM message at the SM layer 408*b*, and passing the SM message to the MM layer 408*a*. The MM layer 408*a* may then encapsulate the SM message as an MM message, and send the MM message to the AMF 404. The AMF 404 may then extract the SM message from the MM message, and forward the SM message to the SMF 402.

In order to send SM messages to the SMF 402, the UE 406 may first establish a PDU session 422 with the SMF 402, for example, through the SM layer 408*b* of the UE 406. The PDU session 422 may be uniquely identified by an ID that separates the PDU session 422 from other PDU sessions, which may be established through one or more other SMFs. When establishing the PDU session 422, the UE 406 may select a slice associated with the SMF 402 or, if the UE 406 does not select a slice, the UE 406 may be assigned a slice. In one aspect, the UE 406 may establish the PDU session 422 with the SMF for control plane CIoT 5GS optimization.

In some aspects, the UE 406 may be configured to send data over a control plane to the SMF 402. For example, the UE 406 may include data in a CPSR message when the UE 406 is in an Idle mode (e.g., 5GMM Idle mode), or the UE 406 may include data in another UL NAS message (e.g., an UL NAS Transport message) when the UE 406 is in a Connected mode (e.g., 5GMM Connected mode).

In some other aspects, the UE 406 may be configured to support SGC. SGC may control the frequency with which the UE transitions from the Idle mode to the Connected mode using a service gap timer (e.g., timer T3447 in 5GS). For example, the back-off (BO) timer 410 may be implemented as a service gap timer. If, however, the UE 406 does not support SGC, the AMF 404 may still manage SGC for the UE 406. For example, the AMF 404 may include a local timer 412 (e.g., timer T3447 in 5GS) associated with SGC for the UE 406. While the local timer 412 is running at the AMF 404, the UE 406 may be prohibited from transitioning to a Connected mode and/or may be prohibited from sending UL NAS messages in the Connected mode.

The SMF 402 may include finite resources and, therefore, may become congested. For example, the SMF 402 may lack sufficient resources to process all SM messages to be received and/or transmitted for all PDU sessions established through the SM 402. The SMF 402 may become congested at one or more of a slice, a DNN, or a combination of both a slice and a DNN. As communication with the SMF 402 may be configured through the AMF 404, the AMF 404 may apply congestion control for the SMF 402.

The SMF 402 may transmit, to the AMF 404, a congestion indication 424, which may indicate the SMF 402 is congested and/or lacks sufficient resources for further communication at one or more of a slice, a DNN, or a combination of both a slice and a DNN. The congestion indication 424 may include a cause code that indicates the reason for the congestion, such as "congestion" (e.g., cause code #22 in 5GS), "insufficient resources for specific slice and DNN" (e.g., cause code #67 in 5GS), or "insufficient resources for specific slice" (e.g., cause code #69 in 5GS).

In response to the congestion indication 424, the AMF 404 may apply congestion control to communication by the UE 406 through the AMF 404 to the SMF 402. At the UE 406, congestion control for the SMF 402 may be applied through at least one BO timer 410 (e.g., one of timers T3448, T3447, T3396, T3584, T3585 in 5GS), which may be configured at the SM layer 408*b* of the UE 406. While the BO timer 410 is running, the UE 406 may be prohibited from sending data and requesting data for the PDU session 422. When the BO timer 410 is terminated, the UE 406 may resume sending SM messages and requesting data for the PDU session 422.

The UE 406 may determine whether a BO timer 410, which may be associated with the PDU session 422, is terminated. The BO timer 410 may be unterminated when the BO timer 410 is running. When the UE 406 determines that the BO timer 410 is unterminated, the UE 406 may refrain from sending to and requesting from, the SMF 402, data over a control plane associated with the PDU session 422. Correspondingly, when the UE 406 determines that the BO timer 410 is terminated, the UE 406 may send to and request from, the SMF 402, data over the control plane associated with the PDU session 422.

According to a first aspect, the UE 406 may be configured to apply the BO timer 410 at the SM layer 408b to restrict sending and requesting data on the MM layer 408a. For example, the SM layer 408b may be prohibited from sending SM signaling (e.g., control signaling) while the BO timer 410 is running (e.g., the BO timer 410 may include at least one of timers T3396 for DNN congestion, T3584 for slice and DNN congestion, and/or T3585 for slice congestion in 5GS). As the UE 406 may be configured to send data over the control plane for the PDU session 422, the UE 406 may be configured such that the BO timer 410 is extended to apply to data over the control plane for the PDU session 422, rather than only applying the BO timer 410 to SM signaling (e.g., control signaling).

Further to such an aspect, the UE 406 may not send or request data over the control plane for the PDU session 422 established with the congested SMF 402 while the BO timer 410 is running (e.g., except if the UE 406 is configured for high-priority access in a selected PLMN or the PDU session 422 is an emergency PDU session). In effect, the SM layer 408b may be prohibited from initiating the transmission of data over the control plane and prohibited from requesting the MM layer 408a to send data over the control plane for the PDU session 422 while the BO timer 410 is running. For example, the UE 406 may be prohibited from sending data over the control plane in a CPSR message when the BO timer 410 is running and the UE 406 is in an MM Idle mode (e.g., 5GMM Idle mode) for the PDU session 422, which is correspondingly associated with the DNN and/or slice that is congested at the SMF 402. In another example, the UE 406 may be prohibited from sending data over the control plane in an UL NAS Transport message when the BO timer 410 is running and the UE 406 is in an MM Connected mode (e.g., 5GMM Connected mode) for the PDU session 422, which is correspondingly associated with the DNN and/or slice that is congested at the SMF 402.

In some aspects, the UE 406 may still be allowed to request to establish user-plane resources for the PDU session 422 if the PDU session 422 is not only control plane. For example, the UE 406 may request to establish user-plane resources for the PDU session 422 to be used for control plane CIoT 5GS optimization even when the BO timer 410 is running.

The BO timer 410 may be terminated when the BO timer 410 expires. However, the BO timer 410 may be further terminated based on reception of data at the SM layer 408b for the PDU session 422. When the BO timer 410 is terminated, the SM layer 408b may resume sending data over the control plane and requesting data for the PDU session 422 established with the SMF 402.

According to a second aspect, the AMF 404 may be configured to apply congestion control for the congested SMF 402 with which the UE 406 has established the PDU session 422. In such an aspect, the SM layer 408b may initially be unaware that the SMF 402 is congested and, therefore, the SM layer 408b may generate data 438 to send to the SMF 402 in association with the PDU session 422. The data 438 may be intended to be sent over a control plane and/or may be associated with an ID of the PDU session 422.

The SM layer 408b may provide the data 438 to the MM layer 408a, as well as the ID of the PDU session 422 associated with the data 438. The MM layer 408a may encapsulate or packetize the SM message including the data 438 in an UL MM message 428. If the UE 406 is to send the UL MM message 428 in an Idle mode, the MM layer 408a may include the data 438 in a CPSR message. If the UE 406 is to send the UL MM message 428 in a Connected mode, the MM layer 408a may include the data 438 in an UL NAS Transport message.

The MM layer 408a may include information indicating the ID of the PDU session 422 in the UL MM message 428. In some aspects, the UL MM message 428 may include a CIoT Small Data Container IE, a Payload Container Type IE, a and/or Payload Container IE, which may be inserted by the MM layer 408a based on the data 438. When sending data over the control plane, the MM layer 408a may include the data 438 in the Payload Container IE, and may set the Payload Container Type IE to indicate "control plane data."

The AMF 404 may receive the UL MM message 438 for the congested SMF 402. In response, the AMF 404 may apply congestion control for the congested SMF 402. For example, the AMF 404 may generate a DL MM message 430, which may be a DL NAS Transport message, a Service Reject message, or, if the AMF 404 is only rejecting data for the PDU session 422 with the congested SMF 402, may be a Service Accept message (e.g., as the AMF 404 may not be rejecting all data for all PDU sessions).

In some aspects, if the UL MM message 428 includes the CIoT Small Data Container IE, the AMF 404 may include the same CIoT Small Data Container IE in the DL MM message 430. In such aspects, the AMF 404 may refrain from ciphering the value part of the CIoT Small Data Container IE, because the DL MM message 430 may be sent in a ciphered manner.

In some other aspects, if the UL MM message 428 includes an NAS Message Container IE with at least the Payload Container Type IE, Payload Container IE, and ID of the PDU session 422, the AMF 404 may include at least the same Payload Container IE (e.g., including the data 438), ID of the PDU session 422, and/or the Payload Container Type IE (e.g., indicating "control plane data") in the DL MM message 430.

In addition, the AMF 404 may include a value for the BO timer 410 in the DL MM message 430. In some aspects, the value may be based on a local timer 412 maintained at the AMF 404 (e.g., based on the congestion indication 424 from the SMF 402). For example, the local timer 412 may be a service gap timer (e.g., timer T3447 in 5GS) maintained for the UE 406, such as for a UE that does not support SGC.

Further, the AMF 404 may include an indication of the congestion experienced by the SMF 402, such as slice congestion, DNN congestion, or both slice and DNN congestion. To do so, the AMF 404 may include a cause code in the DL MM message 430. For example, the AMF 404 may include, in the DL MM message 430, a cause code that indicates "congestion" (e.g., 5GMM cause code #22), "insufficient resources for specific slice and DNN" (e.g., 5GMM cause code #67), or "insufficient resources for specific slice" (e.g., 5GMM cause code #69). The cause codes may be set by a policy of an operator of the AMF 404 and/or SMF 402.

In some aspects, the AMF 404 may include a cause code in the DL MM message 430 that specifically indicates congestion of the SMF 402 with respect to data over the control plane. Such a cause code may be used to limit the transmission of data over the control plane by the UE 406 for the ID of the PDU session 422, but may be unrelated to SM signaling (e.g., control signaling). According to such a cause code, the UE 406 would still be able to send SM signaling for the PDU session 422 (assuming the SMF 402 is not also congested with respect to SM signaling). Thus, the BO timer 410 based on a DL MM message 430 indicating such a cause code may only prohibit sending data over the control plane by the UE 406 for the PDU session 422.

Upon reception of the DL MM message 430 by the UE 406, the MM layer 408a may identify the timer value included in the DL MM message 430. The MM layer 408a may pass the timer value to the SM layer 408b and, accordingly, the SM layer 408b may set the BO timer 410 to the timer value indicated in the DL MM message 430. The SM layer 408b may then begin the BO timer 410, which may restrict transmission of data and requests for data associated with the PDU session 422 established with the congested SMF 402.

If the DL MM message 430 includes the Payload Container Type IE indicating "control plane data," includes the ID of the PDU session 422, and/or includes the CIoT Small Data Container IE, the MM layer 408a may pass the data 438 included in the DL MM message 430 back to the SM layer 408b.

Subsequently, the SM layer 408b may await termination of the BO timer 410. The BO timer 410 may be terminated upon expiration of the BO timer 410 and/or upon reception of data over the control plane for the PDU session 422 from the SMF 402. When the BO timer 410 is terminated, the SM layer 410 may again pass the data 438 to the MM layer 408a, potentially along with the ID of the PDU session 422. The MM layer 408a may encapsulate or packetize the data 438 in an UL MM message 436 (e.g., a CPSR message or an UL NAS Transport message), which may include the ID of the PDU session 422, and may send the UL MM message 436 to the AMF 404. In association with the PDU session 422, the AMF 404 may send the data 438 on to the SMF 402, which may no longer be congested after termination of the BO timer 410.

Figure 5:
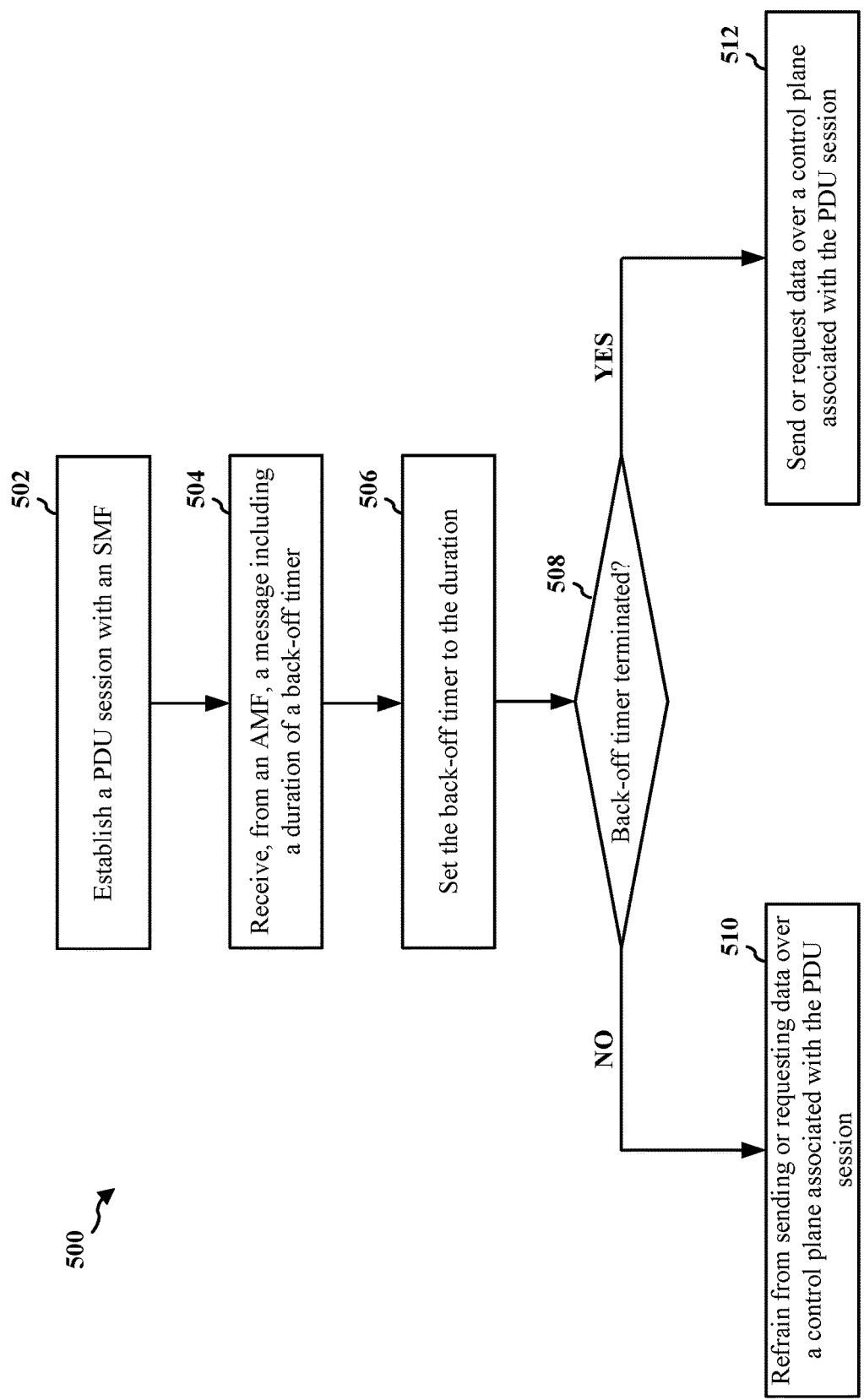
FIG. 5 is a flowchart of a method of wireless communication.

FIG. 5 is a flowchart of a method 500 of wireless communication. The method 500 may be performed by a UE (e.g., the UE 104, the UE 350, the UE 406, which may include the memory 360 and which may be the entire UE 350 or a component of the UE 350, such as the TX processor 368, the RX processor 356, and/or the controller/processor 359). In various aspects, one or more of the illustrated operations may be omitted, transposed, and/or contemporaneously performed.

At 502, the UE may establish a PDU session with an SMF. The PDU session may be associated with an ID. For example, referring to FIG. 4, the UE 406 may establish the PDU session with the SMF 402.

At 504, the UE may receive, from an AMF, a message including a duration of a BO timer. In some aspects, the message including the duration of the BO timer may be received based on transmission by the UE of one of a CPSR or an UL NAS Transport message to the AMF. The one of the CPSR or the UL NAS Transport message may indicate an ID associated with the PDU session. Further, the received message including the duration of the BO timer may include at least one of the ID associated with the PDU session or a cause code associated with the BO timer. For example, the cause code may indicate that data over the control plane for the PDU session with the SMF is prohibited while the BO timer is unterminated. In one aspect, the cause code may be unassociated with SM signaling (e.g., control signaling) and, therefore, SM signaling may still be allowed while the BO is unterminated. For example, referring to FIG. 4, the UE 406 may receive the DL MM message 430 indicating the duration for the BO timer 410 of the UE 406.

At 506, the UE may set the BO timer to the duration indicated in the received message. According to various aspects, the BO timer may be associated with at least one of a DNN, a network slice, and/or SGC (e.g., the timer may be one of timers T3448, T3447, T3396, T3584, or T3585 of 5GS). The BO timer may be configured at an SM layer (e.g., a 5GSM layer) of the UE. For example, referring to FIG. 4, the UE 406 may set the BO timer 410 based on a duration indicated in the DL MM message 430.

At 508, the UE may determine whether the BO timer is terminated or unterminated. The BO timer may be terminated based on at least one of expiration of the BO timer, reception of an SM message indicating the BO timer is to be terminated (e.g., from the AMF or from the SMF), and/or reception of DL data over the control plane associated with the established PDU session. For example, referring to FIG. 4, the UE 406 may determine whether the BO timer 410 is terminated or unterminated.

If the BO timer is unterminated, the method 500 may proceed to 510. At 510, the UE may refrain from sending or requesting data over the control plane associated with the PDU session. For example, referring to FIG. 4, the UE 406 may refrain from sending an UL MM message associated with the PDU session 422 while the BO timer 410 is unterminated.

If the BO timer is terminated, the method 500 may proceed to 512. At 512, the UE may send or request data over the control plane associated with the PDU session. For example, referring to FIG. 4, the UE 406 may send or request data over the control plane associated with the PDU session 422.

Figure 6:
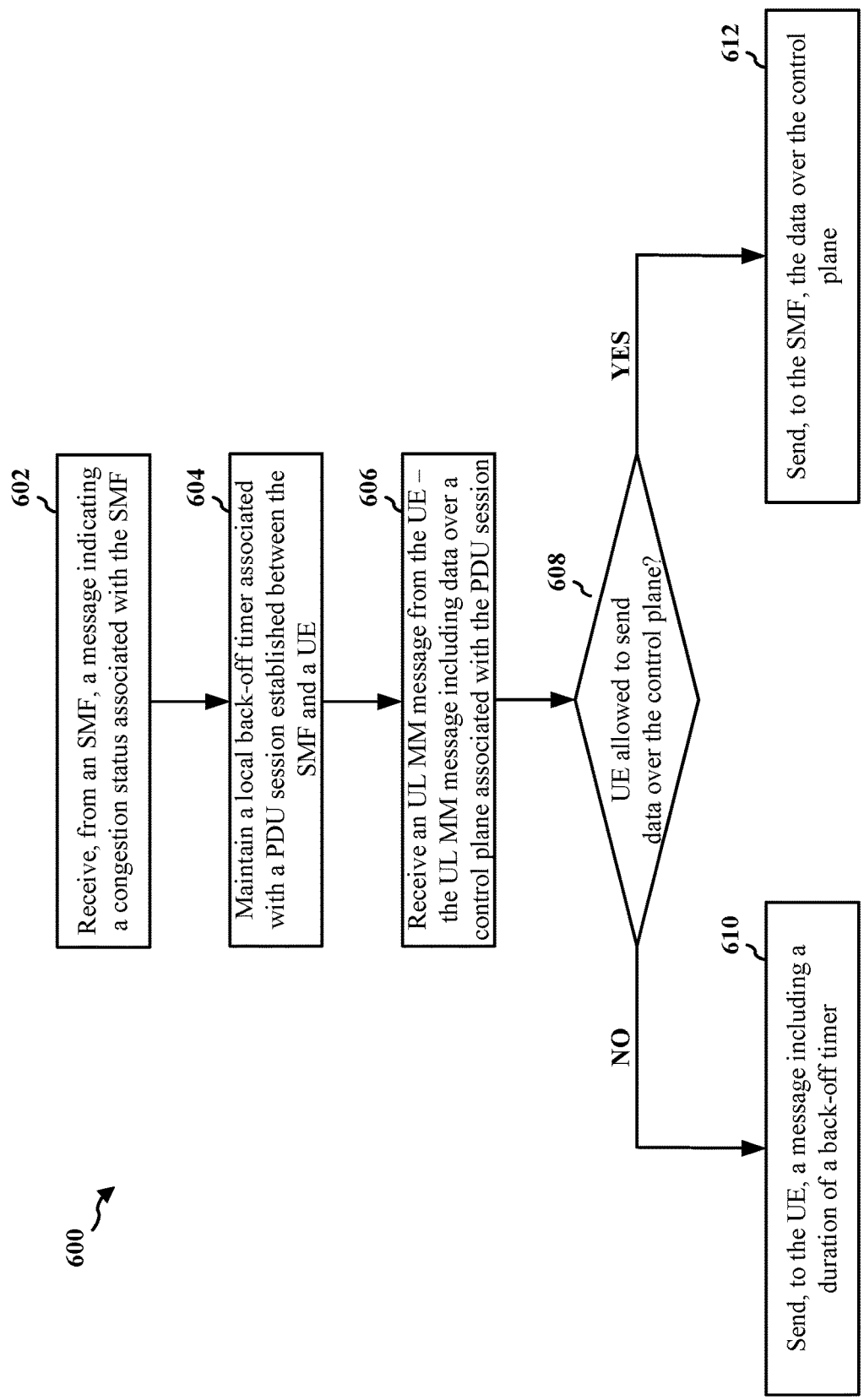
FIG. 6 is a flowchart of a method of wireless communication.

FIG. 6 is a flowchart of a method 600 of wireless communication. The method 600 may be performed by an AMF (e.g., the AMF 192, the other AMFs 193, the base station 310, the AMF 404, which may include the memory 376 and which may be the entire base station 310 or a component of the base station 310, such as the TX processor 316, the RX processor 370, and/or the controller/processor 375). In various aspects, one or more of the illustrated operations may be omitted, transposed, and/or contemporaneously performed.

At 602, the AMF may receive, from an SMF, a message indicating a congestion status associated with the SMF. The congestion status may indicate at least one of a DNN, a network slice, and/or a control plane is congested at the SMF. For example, referring to FIG. 4, the AMF 404 may receive the congestion indication 424 from the SMF 402.

At 604, the AMF may maintain a local timer associated with a PDU session established between the SMF and a UE. The local timer may be associated with at least one of a DNN, a network slice, or SGC associated with the UE and/or the PDU session. For example, referring to FIG. 4, the AMF 404 may maintain the local timer 412 in association with the PDU session 422 established between the UE 406 and the SMF 402.

At 606, the AMF may receive an UL MM message from the UE. The UL MM message may include data over a control plane associated with the PDU session. The UL MM message may be one of a CPSR message or an UL NAS Transport message. For example, referring to FIG. 4, the AMF 404 may receive the UL MM message 428 from the UE 406.

At 608, the AMF may determine whether the UE is allowed or prohibited to send data over the control plane associated with the PDU session established between the SMF and the UE. In one aspect, the AMF may make the determination based on the congestion status received from the SMF. In another aspect, the AMF may make the determination based on the local timer, which may be associated with SGC for the UE. The AMF may determine that the UE is prohibited to send data over the control plane associated with the PDU session when the local timer is running. For example, referring to FIG. 4, the AMF 404 may determine whether the UE 406 is allowed or prohibited to send data over the control plane associated with the PDU session 422, for example, based on the congestion indication 424 and/or based on the local timer 412.

If the AMF determines that the UE is prohibited to send data over the control plane to the SMF in association with the PDU session, the method 600 may proceed to 610. At 610, the AMF may send, to the UE, a DL message including a duration of a BO timer. The BO timer may be associated with at least one of a DNN, a network slice, and/or SGC for the UE and/or for the PDU session. The DL message may be one of a Service Accept message, Service Reject message, or a DL NAS Transport message. The AMF may include a cause code in the DL message. The cause code may indicate that SM signaling (e.g., control signaling) associated with the PDU session is not affected and/or is allowed for the UE when a BO timer of the UE is unterminated—that is, the cause code may only be associated with data over the control plane associated with the PDU session. In some aspects, the DL message may include at least one of an ID associated with the PDU session, data included in the UL MM message received from the UE, and/or a container type associated with the UL MM message. In some other aspects, the duration of the BO timer included in the DL message may be equal to the local timer maintained by the AMF—e.g., the duration may be equal to a local SGC timer maintained by the AMF for the UE, such as when SGC is unsupported by the UE. For example, referring to FIG. 4, the AMF may send, to the UE 406, the DL MM message 430.

If the AMF determines that the UE is allowed to send data over the control plane to the SMF in association with the PDU session, the method 600 may proceed to 612. At 612, the AMF may send, to the SMF, the data over the control plane. For example, referring to FIG. 4, the AMF 404 may send the data 438 over the control plane to the SMF 402.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   establishing a protocol data unit (PDU) session with a session management (SM) function (SMF);
   receiving, from an access and mobility management function (AMF), a message including a duration of a back-off timer associated with the PDU session;
   setting the back-off timer to the duration;
   starting the back-off timer;
   determining whether the back-off timer associated with the PDU session is terminated;
   refraining from sending, to the SMF, data over a control plane associated with the PDU session when the back-off timer is unterminated; and
   sending, to the SMF, the data over the control plane associated with the PDU session when the back-off timer is terminated,
   wherein the message including the duration of the back-off timer is received based on transmission of one of a control plane service request message (CPSR) or an uplink non-access stratum (NAS) transport message to the AMF,
   wherein the one of the CPSR message or the uplink NAS transport message indicates an identifier (ID) associated with the PDU session,
   wherein the message including the duration of the back-off timer further includes at least one of the ID associated with the PDU session or a cause code associated with the back-off timer,
   wherein the cause code indicates that SM signaling associated with control information is allowed when the back-off timer is unterminated.

2. The method of claim 1, wherein the back-off timer is associated with at least one of a data network name (DNN), a network slice, or service gap control (SGC).

3. The method of claim 1, wherein the back-off timer is configured at a SM layer of the UE.

4. The method of claim 1, wherein the back-off timer is terminated based on at least one of expiration of the back-off timer, reception of a SM message indicating the back-off timer is to be terminated, or reception of downlink data over the control plane associated with the PDU session from the SMF.

5. A method of wireless communication by an access and mobility management function (AMF), the method comprising:
receiving a mobility management (MM) message from a user equipment (UE), wherein the MM message includes data over a control plane associated with a protocol data unit (PDU) session established between the UE and a session management (SM) function (SMF);
determining whether the UE is allowed or prohibited to send the data over the control plane to the SMF for the PDU session;
sending, to the UE, a first message including a duration of a first back-off timer when the UE is prohibited to send the data over the control plane to the SMF;
sending, to the SMF, the data over the control plane when the UE is allowed to send the data over the control plane to the SMF; and
maintaining a local back-off timer associated with the PDU session established between the UE and the SMF,
wherein the determination of whether the UE is allowed or prohibited to send the data over the control plane to the SMF for the PDU session is based on the local back-off timer.

6. The method of claim 5, wherein the MM message comprises one of a control plane service request message (CPSR) or an uplink non-access stratum (NAS) transport message.

7. The method of claim 5, wherein the first message comprises at least one of a Service Accept message, Service Reject message, or a downlink non-access stratum (NAS) transport message.

8. The method of claim 5, further comprising:
receiving, from the SMF, a second message indicating a congestion status associated with the SMF,
wherein the determination of whether the UE is allowed or prohibited to send the data over the control plane to the SMF for the PDU session is based on the congestion status.

9. The method of claim 8, wherein the congestion status is associated with at least one of a data network name (DNN) or a network slice.

10. The method of claim 8, wherein a cause code is included in the first message based on the congestion status.

11. The method of claim 10, wherein the cause code indicates that SM signaling associated with control information is allowed by the UE when the first back-off timer is unterminated.

12. The method of claim 5, wherein the first message includes at least one of an identifier (ID) associated with the PDU session, the data included in the MM message, or a container type associated with the MM message.

13. The method of claim 5, wherein the first back-off timer is associated with at least one of a data network name (DNN), a network slice, or service gap control (SGC).

14. The method of claim 5, wherein the local back-off timer comprises a service gap control (SGC) timer, and wherein the duration of the first back-off timer included in the first message is based on the SGC timer when SGC is unsupported by the UE.

15. A user equipment (UE) comprising:
a memory; and
at least one processor coupled to the memory and configured to:
establish a protocol data unit (PDU) session with a session management (SM) function (SMF);
receive, from an access and mobility management function (AMF), a message including a duration of a back-off timer associated with the PDU session;
set the back-off timer to the duration;
start the back-off timer;
determine whether the back-off timer associated with the PDU session is terminated;
refrain from sending, to the SMF, data over a control plane associated with the PDU session when the back-off timer is unterminated; and
send, to the SMF, the data over the control plane associated with the PDU session when the back-off timer is terminated,
wherein the message including the duration of the back-off timer is received based on transmission of one of a control plane service request message (CPSR) or an uplink non-access stratum (NAS) transport message to the AMF,
wherein the one of the CPSR message or the uplink NAS transport message indicates an identifier (ID) associated with the PDU session,
wherein the message including the duration of the back-off timer further includes at least one of the ID associated with the PDU session or a cause code associated with the back-off timer,
wherein the cause code indicates that SM signaling associated with control information is allowed when the back-off timer is unterminated.

16. The UE of claim 15, wherein the back-off timer is associated with at least one of a data network name (DNN), a network slice, or service gap control (SGC).

17. The UE of claim 15, wherein the back-off timer is configured at a SM layer of the UE.

18. The UE of claim 15, wherein the back-off timer is terminated based on at least one of expiration of the back-off timer, reception of a SM message indicating the back-off timer is to be terminated, or reception of downlink data over the control plane associated with the PDU session from the SMF.

19. An Access and Mobility Management Function (AMF) comprising:
a memory; and
at least one processor coupled to the memory and configured to:
receive a mobility management (MM) message from a user equipment (UE), wherein the MM message includes data over the control plane associated with a protocol data unit (PDU) session established between the UE and a session management (SM) function (SMF);
determine whether the UE is allowed or prohibited to send the data over the control plane to the SMF for the PDU session;
send, to the UE, a first message including a duration of a first back-off timer when the UE is prohibited to send the data over the control plane to the SMF;
send, to the SMF, the data over the control plane when the UE is allowed to send the data over the control plane to the SMF; and
maintain a local back-off timer associated with the PDU session established between the UE and the SMF,
wherein the determination of whether the UE is allowed or prohibited to send the data over the control plane to the SMF for the PDU session is based on the local back-off timer.

20. The AMF of claim 19, wherein the MM message comprises one of a control plane service request message (CPSR) or an uplink non-access stratum (NAS) transport message.

21. The AMF of claim 19, wherein the first message comprises at least one of a Service Accept message, Service Reject message, or a downlink non-access stratum (NAS) transport message.

22. The AMF of claim 19, wherein the at least one processor is further configured to:
receive, from the SMF, a second message indicating a congestion status associated with the SMF,
wherein the determination of whether the UE is allowed or prohibited to send the data over the control plane to the SMF for the PDU session is based on the congestion status.

23. The AMF of claim 22, wherein the congestion status is associated with at least one of a data network name (DNN) or a network slice.

24. The AMF of claim 22, wherein a cause code is included in the first message based on the congestion status.

25. The AMF of claim 24, wherein the cause code indicates that SM signaling associated with control information is allowed by the UE when the first back-off timer is unterminated.

26. The AMF of claim 19, wherein the first message includes at least one of an identifier (ID) associated with the PDU session, the data included in the MM message, or a container type associated with the MM message.

27. The AMF of claim 19, wherein the first back-off timer is associated with at least one of a data network name (DNN), a network slice, or service gap control (SGC).

28. The AMF of claim 19, wherein the local back-off timer comprises a service gap control (SGC) timer, and wherein the duration of the first back-off timer included in the first message is based on the SGC timer when SGC is unsupported by the UE.

\* \* \* \* \*